United States Patent
Mangeney et al.

(10) Patent No.: US 12,181,694 B2
(45) Date of Patent: Dec. 31, 2024

(54) ELECTROMAGNETIC CAVITY ABLE TO SUPPORT TAMM MODES

(71) Applicants: Centre National De La Recherche Scientifique, Paris (FR); Universite Claude Bernard Lyon 1, Villeurbanne (FR); Sorbonne Universite, Paris (FR); Ecole Normale Superieure De Paris, Paris (FR); UNIVERSITE DE PARIS, Paris (FR)

(72) Inventors: Juliette Mangeney, Cachan (FR); Sukhdeep Dhillon, Bourg-la-Reine (FR); Clémentine Symonds, Lyons (FR); Joël Bellessa, Lyons (FR); Simon Messelot, Arcueil (FR)

(73) Assignees: CENTRE NATIONAL DE LA RECHERCHE SCIENTIFIQUE, Paris (FR); UNIVERSITE CLAUDE BERNARD LYON 1, Villeurbanne (FR); SORBONNE UNIVERSITE, Paris (FR); ECOLE NORMALE SUPERIEURE DE PARIS, Paris (FR); UNIVERSITE DE PARIS, Paris (FR)

( * ) Notice: Subject to any disclaimer, the term of this patent is extended or adjusted under 35 U.S.C. 154(b) by 611 days.

(21) Appl. No.: 17/601,272

(22) PCT Filed: Apr. 3, 2020

(86) PCT No.: PCT/EP2020/059572
§ 371 (c)(1),
(2) Date: Apr. 22, 2022

(87) PCT Pub. No.: WO2020/201513
PCT Pub. Date: Oct. 8, 2020

(65) Prior Publication Data
US 2022/0244437 A1    Aug. 4, 2022

(30) Foreign Application Priority Data

Apr. 5, 2019   (FR) .................................. 1903673

(51) Int. Cl.
*G02B 5/08*    (2006.01)
*G02F 1/01*    (2006.01)

(52) U.S. Cl.
CPC ......... *G02B 5/0866* (2013.01); *G02F 1/0102* (2013.01); *G02F 2203/10* (2013.01); *G02F 2203/13* (2013.01)

(58) Field of Classification Search
CPC . G02B 5/0866; G02F 1/0102; G02F 2203/10; G02F 2203/13
(Continued)

(56) References Cited

U.S. PATENT DOCUMENTS

2017/0254751 A1    9/2017   Zhang et al.

FOREIGN PATENT DOCUMENTS

CN    103728275 A    4/2014

OTHER PUBLICATIONS

Auguié, Baptiste, et al., "Critical coupling to Tamm plasmons", Journal of Optics, Feb. 13, 2015, vol. 17, No. 3, id. 035003, retrieved from the Internet at <URL: https://arxiv.org/pdf/1411.0608.pdf> on Oct. 4, 2021, 11 pages.
(Continued)

*Primary Examiner* — William Choi
(74) *Attorney, Agent, or Firm* — BakerHostetler

(57) ABSTRACT

A Tamm electromagnetic cavity (10, 20, 30, 40, 60) possessing a resonant frequency in the THz domain, comprising:
an interference mirror that is reflective in the THz domain, this mirror consisting of a stack of dielectric layers (7) comprising an alternation, in a z-direction, of two
(Continued)

different layers, a layer referred to as the layer of high refractive index (2) and a layer referred to as the layer of low refractive index (4), the index of the layer of low refraction being lower than that of the layer of high refractive index, and being manufactured by stacking layers mechanically or by joining dielectric layers to one another;

an upper metal layer (5) deposited on or added to an upper dielectric layer of said interference mirror so as to form a structure that supports at least one Tamm mode in the THz domain, the upper metal layer (5) being structured so as to form an antenna possessing a resonant frequency equal to that of the electromagnetic cavity.

18 Claims, 9 Drawing Sheets

(58) Field of Classification Search
USPC .......................................................... 359/238
See application file for complete search history.

(56) References Cited

OTHER PUBLICATIONS

Chen, Yikai, et al., "Tamm plasmon- and surface plasmon-couples emissions from hybrid plasmonic-photonic structures", Optica, Dec. 2014, vol. 1, No. 6, pp. 407-413, The Optical Society Association, US.

Chestnov, I. Yu., et al., "One-dimensional Tamm plasmons: Spatial confinement, propagation, and polarization properties", Physical Review B, Dec. 26, 2017, pp. 245309-1-245309-8, vol. 96, No. 24, American Physical Society, U.S.

Hosseinbeig, Ahmad, et al., "A reconfigurable subwavelength plasmonic fano nano-antenna based on split ring resonator" Journal of Magnetism and Magnetic Materials, pp. 203-207, Feb. 1, 2017, vol. 423, Netherlands, retrieved accepted manuscript from the Internet at <URL: https://ur.booksc.eu/book/61985784/ad8ca4> on Oct. 4, 2021, 8 pages.

International Searching Authority, International Search Report (ISR) and Written Opinion received for International Application No. PCT/EP2020/059572, dated Jun. 9, 2020, 17 pages, European Patent Office, Netherlands.

Lheureux, Guillaume, "Thesis: Study of the laser effect in Tamm plasmon structures", Plasma Physics, Université Claude Bernard—Lyon I, Dec. 11, 2015, [physics.plasm-ph], retrieved from the Internet at: <URL: https://tel.archives-ouvertes.fr/tel-01327966/document> on Oct. 4, 2021, 167 pages, Republic of France.

National Industrial Property Institute, Preliminary Search Report and Written Opinion received for Application No. FR1903673, dated Jan. 8, 2020, 8 pages, Republic of France.

Wang, Li, et al., "Controllable Dual Hybrid Tamm Plasmon Modes in Binary Gold Nanodisk Arrays and Distributed Bragg Reflector Structure", Plasmonics, Jan. 23, 2019 (online), pp. 1091-1098, vol. 14, No. 5, Springer, US, retrieved from the Internet at <URL: https://pdf.zlibcdn.com/dtoken/f9eddc624246e3963alafd085c6183db/s11468-018-00897-3.pdf> on Oct. 4, 2021.

Wang, Shuai, et al., "Tunable Terahertz Absorption with Optical Tamm State in the Graphene-Bragg Reflector Configuration", Advances in Condensed Matter Physics, Aug. 5, 2018, 6 pages, vol. 2018, id. 3063161, Hindawi, UK.

Yu, Yao, et al., "Fabrication and Characterization of a wide-bandgap and high-Q terahertz distributed-Bragg-reflector micro cavities", Optics Communications, May 26, 2018 (online), pp. 84-88, vol. 426, Elsevier B.V., Netherlands.

Zhang, Qi, et al., "Letters: Collective non-perturbative coupling of 2D electrons with high-quality-factor terahertz cavity photons," Nature Physics, Aug. 22, 2016 (online), pp. 1005-1012, vol. 12, Macmillan Publishers Ltd., US.

ELECTROMAGNETIC CAVITY ABLE TO SUPPORT TAMM MODES

TECHNICAL FIELD

The present invention relates to a Tamm electromagnetic cavity possessing at least one terahertz (THz) resonant frequency.

PRIOR ART

Below, a resonant cavity possessing at least one resonant frequency in the typical range of 0.1 THz to 10 THz will be referred to as a THz cavity. THz cavities are used for the development of many passive and active components such as THz radiation sources, detectors, sensors, modulators and filters. In addition, these cavities are essential to THz devices aiming to achieve strong radiation-matter coupling. THz cavities also allow the sensitivity of spectroscopy systems to be improved by making it possible to greatly increase the length of interaction between the absorbent medium and the radiation. Current THz cavities may be split into two main categories: optical resonators and electronic resonators.

Electronic resonators are based on metal structures allowing very sub-wavelength confinement of radiation, because propagation effects are negligible and the mode volume is not directly limited by the wavelength. These metal structures are, for example, resonator patch antennas or split-ring resonators. However, these electronic resonators possess a low quality factor (typically 10 at room temperature) this being a substantial drawback for the production of many THz components.

In contrast, optical resonators such as Fabry-Perot cavities possess a very high quality factor, this being a feature that is very attractive for the development of many THz components. It is in particular known to produce THz cavities that are able to achieve strong light-matter coupling between cavity photons and 2D electron gases (Zhang, Qi, et al. "Collective non-perturbative coupling of 2D electrons with high-quality-factor terahertz cavity photons." Nature Physics 12.11 (2016): 1005).

However, the modes of these cavities are based on standing waves with propagation effects dominant. Consequently, the mode volume of optical resonators is large; specifically, one of the dimensions of the resonator must be commensurable with the resonant wavelength (with $\lambda_{\text{eff}}/2$ the half wavelength within the active layer). This diffraction limit is unfavorable to a substantial interaction of the modes of the optical resonator with active or passive elements of small sizes. Thus, it is very difficult to efficiently couple elements of characteristic size of a few tens of microns to the modes of conventional optical resonators at THz frequencies. In addition, the resonant frequency of these optical cavities can be adjusted only via the effective length of the resonator, and the profile of the modes is difficult to control or modify.

There are currently no THz resonators that combine a high quality factor with modes confined in a relatively small volume, and that also allow the properties of the optical modes to be controlled.

The invention aims to resolve the aforementioned limitations of the prior art and proposes a new type of THz resonator based on a Tamm cavity.

SUMMARY OF THE INVENTION

To this end, one subject of the invention is a Tamm electromagnetic cavity possessing a resonant frequency in the THz domain, comprising:

an interference mirror that is reflective in the THz domain, this mirror consisting of a stack of dielectric layers comprising an alternation, in a z-direction, of two different layers, a layer referred to as the layer of high refractive index and a layer referred to as the layer of low refractive index, the index of the layer of low refraction being lower than that of the layer of high refractive index, and being manufactured by stacking layers mechanically or by joining dielectric layers to one another;

an upper metal layer deposited on or added to an upper dielectric layer of said interference mirror so as to form a structure that supports at least one Tamm mode in the THz domain, the upper metal layer being structured so as to form an antenna possessing a resonant frequency equal to that of the electromagnetic cavity.

According to particular embodiments of the invention:

at least one of the layers of low refractive index of the interference mirror is formed by a spacer separating two layers of high refractive index so as to obtain a layer of air between two layers of high refractive index;

the upper metal layer is continuous;

the upper metal layer is structured so as to control the transverse mode and the polarization of the one or more Tamm modes;

the structured upper metal layer forms a bow-tie antenna, a patch antenna, a dipole antenna, or a split-ring resonator;

the dielectric layers are made of high-resistivity silicon, of semi-insulating GaAs or of quartz;

the dielectric layers are made of a polymer film such as Kapton;

the cavity comprises a layer referred to as the mirror layer, above the upper metal layer and separated by a dielectric layer, said mirror layer consisting of a lower metal layer and an upper carrier layer;

the cavity comprises an active element of a characteristic size comprised between 1 and 100 microns, and preferably 10 and 40 microns, placed in the cavity so as to be able to be coupled to the Tamm mode excited in said cavity;

the active element is placed within a layer of air of the interference mirror, said layer being located below the upper dielectric layer;

the active element is made of graphene;

the upper metal layer is a layer of superconductor.

Another subject of the invention is a Tamm electromagnetic cavity possessing a resonant frequency in the THz domain, comprising:

an interference mirror that is reflective in the THz domain, this mirror consisting of a stack of dielectric layers comprising an alternation, in a z-direction, of two different layers, a layer referred to as the layer of high refractive index and a layer referred to as the layer of low refractive index, the index of the layer of low refraction being lower than that of the layer of high refractive index, and being manufactured by stacking layers mechanically or by joining dielectric layers to one another;

an upper metal layer deposited on or added to an upper dielectric layer of said interference mirror so as to form a structure that supports at least one Tamm mode in the THz domain, the upper metal layer being structured so as to form a grating of metal strips of width s and of period p, separated by a distance a, and of fill factor ff=s/p with p=s+a.

According to particular embodiments of the invention:

the fill factor ff of the grating of metal strips varies in the x-direction so as to allow a plurality of different THz frequencies of incident radiation to be coupled to said electromagnetic cavity.

Another subject of the invention is a method for using an electromagnetic cavity according to any one of the preceding claims, comprising:

illuminating said cavity with incident radiation propagating in said z-direction at a THz frequency equal to the resonant frequency of said cavity;

exciting a Tamm mode at a resonant frequency of the cavity.

According to particular embodiments of this method of use:

the angle of incidence of the radiation incident on said cavity is non-zero, and preferably larger than 25°;

it comprises transmitting THz radiation.

BRIEF DESCRIPTION OF THE FIGURES

Other features, details and advantages of the invention will become apparent on reading the description given with reference to the appended drawings, which are given by way of example and show, respectively.

DETAILED DESCRIPTION

Optical resonators combining low losses and a low mode volume are known in the spectral range of the near infrared. These resonators are based on Tamm cavities, which combine a metal mirror and a DBR interference mirror (DBR standing for distributed Bragg reflector), the DBR being produced by epitaxy of successive layers of dielectrics or semiconductors (Thesis by Guillaume Lheureux. *Étude de l'effet laser dans les structures à plasmon Tamm* [Study of the laser effect in Tamm plasmon structures]. Plasma physics [physics.plasm-ph]. Claude Bernard University—Lyon I, 2015. French. <NNT: 2015LYO10341>. <tel-01327966>). These Tamm cavities allow a good mode confinement at the interface between the DBR and the metal mirror deposited directly on the DBR. Furthermore, the losses due to the metal are lower therein because the mode is almost entirely distributed in the DBR.

However, this solution cannot be transposed to the THz range using conventional manufacturing processes because of the wavelengths of the order of about one hundred microns, which imply in the DBR dielectric or semiconductor layers of several tens of microns in thickness. Specifically, the DBR is generally produced by epitaxial growth of the various layers, this not being possible for thicknesses as large as these.

Figure 1:
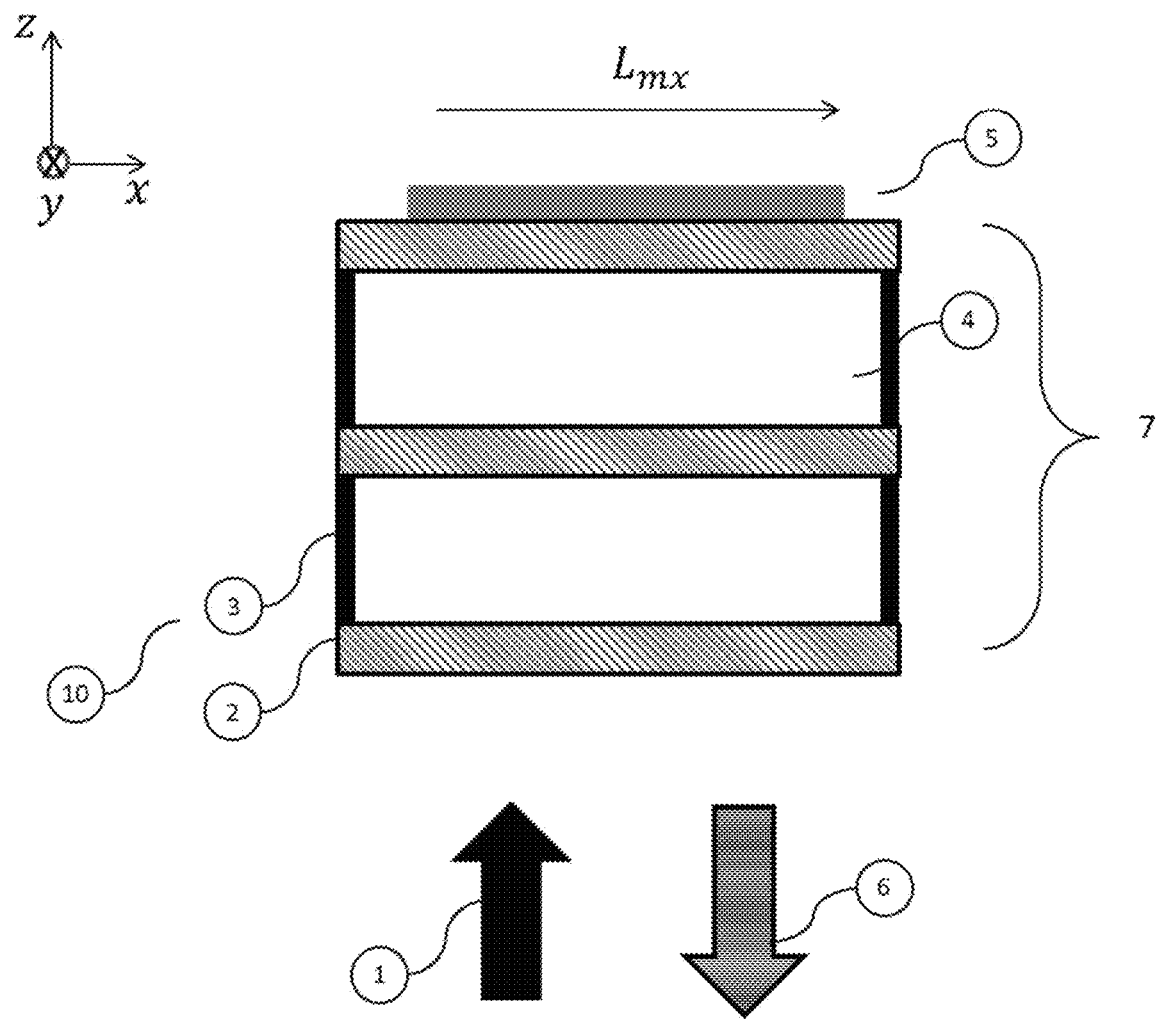
FIG. 1, a Tamm electromagnetic THz cavity according to a first embodiment of the invention.

The invention is based on a Tamm resonator suitable for the THz spectral range. FIG. 1 shows a schematic profile view of a Tamm electromagnetic THz cavity 10 according to a first embodiment of the invention. In this embodiment, the cavity is formed from a periodic stack 7 and from a metal layer 5. The periodic stack 7 comprises an alternation, in a z-direction, of dielectric or semiconductor layers of high and low refractive index forming an interference mirror or DBR (distributed Bragg reflector), and having an upper layer of high refractive index. By low and high refractive index, what is meant is that the refractive index that is said to be high is higher than the refractive index that is said to be low. The stack reflects a certain wavelength range (called the band gap) in the spectral range of the incident THz radiation 1 propagating in the z-direction. The thickness of each of the layers is equal to about an uneven multiple of $\lambda/4n$ (n refractive index in the layer), $\lambda$ being the central wavelength of the band gap of this periodic stack, which band gap contains the resonant wavelength of the Tamm cavity. This ability to use dielectric or semiconductor layers thicker than $\lambda/4n$ is very important because it in particular allows thick layers to be used when the same layers are technologically difficult to obtain when thin, as is the case with silicon.

This stack 7 has the advantage of being manufactured without recourse to microfabrication processes such as the semiconductor epitaxy used in the infrared-visible domain. Commercially available dielectric layers (examples of which will be presented below) are simply stacked mechanically on top of one another in the z-direction.

In one non-limiting example, the stack 7 consists of an alternation of layers of high-resistivity silicon 2 (high refractive index) and of air 4 (low refractive index) in a z-direction. In this example, the layers of air and of high-resistivity silicon have thicknesses $e_{air}=75$ µm and $e_{si}=70$ µm, respectively. The band gap of the interference mirror formed by the stack 7 is centered on $\lambda_B=300$ µm (equivalent to 1 THz); the layers measuring $e_{air}=\mu_B/4n_{air}$ and $e_{Si}=3\lambda_B/4n_{Si}$ ($n_{air}$ the index of air in the THz domain and $n_{Si}$ the index of silicon in the THz domain). The layers of air are formed between the silicon layers using a spacer 3. According to the embodiment of FIG. 1, the cavity 10 comprises a stack 7 of two pairs of layers and an upper layer of silicon. In another embodiment, the cavity comprises a periodic stack of a plurality of layer pairs separated by respective spacers. In another embodiment, the dielectric layers of the stack 7 are flexible polymer films that potentially generate very low losses in the THz range, such as for example Kapton, or are made of semi-insulating GaAs or of quartz.

Figure 2:
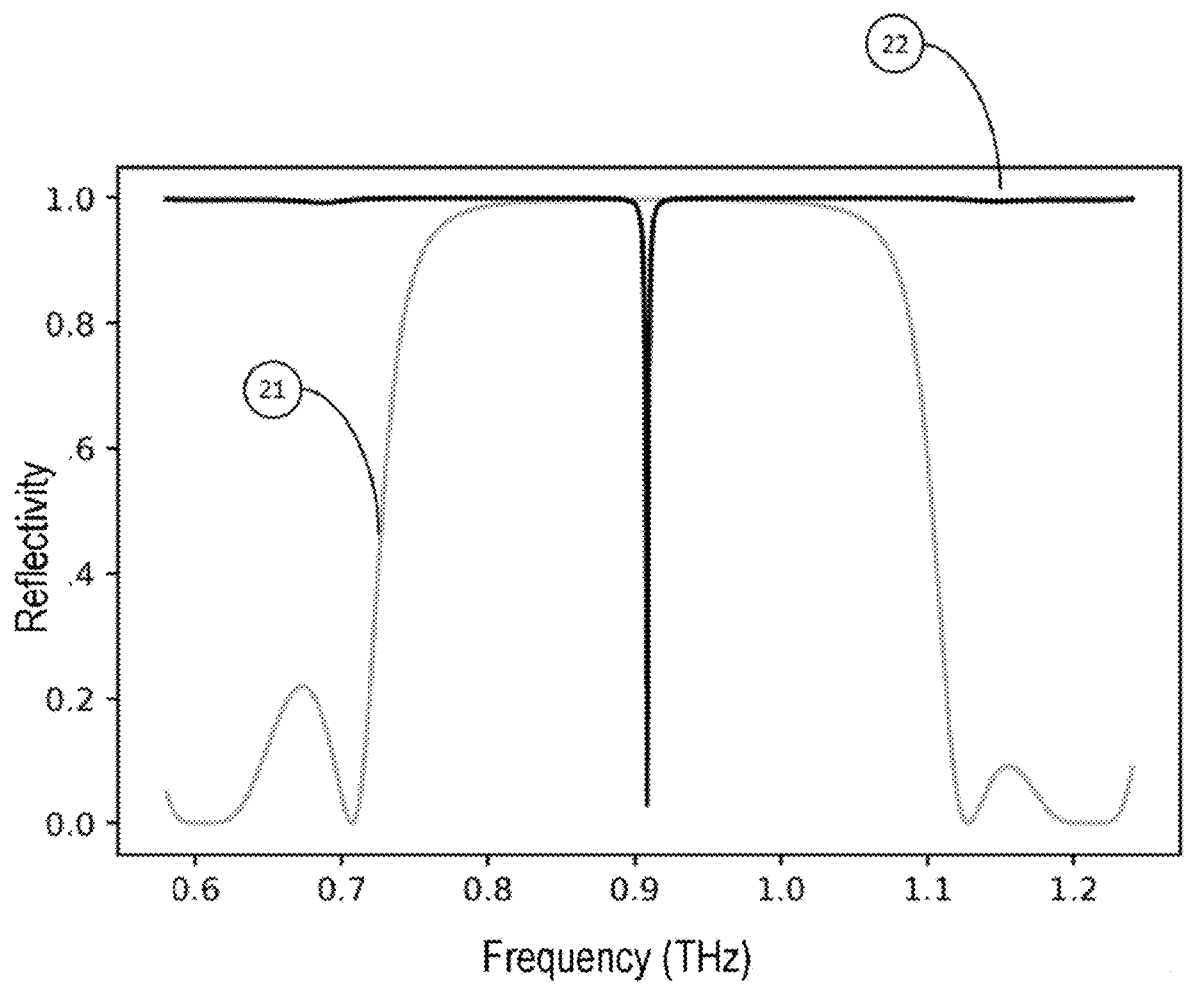
FIG. 2, the reflectivity of the electromagnetic cavity of the first embodiment of the invention as a function of the wavelength of the incident radiation.

Using the transfer-matrix method, which is well known to those skilled in the art, it is possible to compute the reflectivity of the Bragg mirror 7 of the cavity 10 as a function of the frequency of incident radiation 1. Curve 21 of FIG. 2 shows this reflectivity as a function of frequency; as may be seen, there is a certain frequency range in which reflectivity is high, before decreasing outside of this region. It is a question of the band gap of the Bragg mirror (DBR), of central frequency $f_B=c/\lambda_B$.

The stack of the cavity 10 of FIG. 1 is covered with a continuous upper metal layer 5. By metal, what is meant here is a material with an electrical conduction of metal type. In the embodiment of FIG. 1, the upper metal layer is a gold layer of 200 nm thickness. In this embodiment, the upper metal layer contains no discontinuities and does not entirely cover the upper dielectric layer of the stack 7. In another embodiment, the upper metal layer covers the upper dielectric layer completely and without discontinuity. It is deposited on top of the last dielectric layer of the stack 7 using techniques known to those skilled in the art, vacuum deposition for example. In another embodiment, the metal layer is replaced by a layer of superconductor, such as for example a superconductor of niobate type. Alternatively, the upper metal layer may be made of doped graphene. Alternatively, this layer may be added, i.e. transferred and then bonded to the stack.

For incident radiation 1 with a wave vector perpendicular to the interface, i.e. propagating in the z-direction, the addition of an upper metal layer 5 makes it possible to confine the electromagnetic field at the interface between the DBR and the metal layer 5. This mode exists for the transverse-electric (TE) polarization and the transverse-magnetic (TM) polarization. The sub-wavelength confinement of the modes metal-side is achieved by virtue of the very highly negative dielectric constant of the metal. In contrast, dielectric-side, the confinement is achieved by virtue of the presence of the band gap of the DBR. In the embodiment of FIG. 1, the phase match between the metal mirror 5 and the stack 7 induces a resonant frequency of the Tamm modes at the central frequency of the DBR.

As the DBR 7 of the embodiment of FIG. 1 possesses a reflectivity centered on $\lambda_B$=300 µm, the frequency of the fundamental Tamm mode is then about $f_{Tamm}=\omega_{Tamm}/2\pi$=0.91 THz. There are many other Tamm modes in the cavity of higher frequencies. Below, this frequency of the Tamm mode will be called the "resonant frequency of the cavity". Thus, radiation 1 incident at this frequency, propagating in the z-direction with a TM or TE polarization, will be coupled in the cavity 10 and will excite the Tamm mode at the interface between the upper metal layer and the upper dielectric layer of said Bragg mirror. To allow the excitation of the Tamm mode, the difference between a frequency of the incident radiation and the resonant frequency of the cavity must be smaller than the spectral width of the resonant mode. Curve 22 of FIG. 2, which was obtained using the transfer-matrix method, shows the reflectivity of the cavity of FIG. 1 as a function of the wavelength of the incident radiation 1. With respect to the reflectivity of the DBR 7 alone (curve 21), an absorption peak of the cavity 10 corresponding to the Tamm mode is observed, in the band gap of the DBR.

This Tamm mode possesses a longitudinal extent (in the z-direction) of $\lambda_{eff}/2$ in the DBR 7. In addition, in the transverse direction (in the x- and y-directions), the electric field of the Tamm mode is confined to the region of the DBR located below the upper metal layer. The transverse spatial extension in the x-direction of the Tamm mode is therefore essentially limited by the transverse dimension $L_{(m,x)}$ in the x-direction of the upper metal layer 5, making possible a transverse confinement of the Tamm mode. Likewise, the transverse spatial extension in the y-direction of the Tamm mode is therefore essentially limited by the transverse dimension in the y-direction of the upper metal layer 5.

The quality factor Q of the cavity 10 of the embodiment of FIG. 1 is 100.

In another embodiment, the upper metal layer is a conductive material of lower reflectivity, such as graphene, and the cavity 10 operates in transmission mode. In another embodiment, the incident radiation 1 and reflected radiation 6 are of oblique incidence. By oblique what is meant here is that the angle that the angle made by the direction of propagation of the incident radiation and the z-direction of the stack is non-zero, and preferably larger than 25°.

Figure 3A:
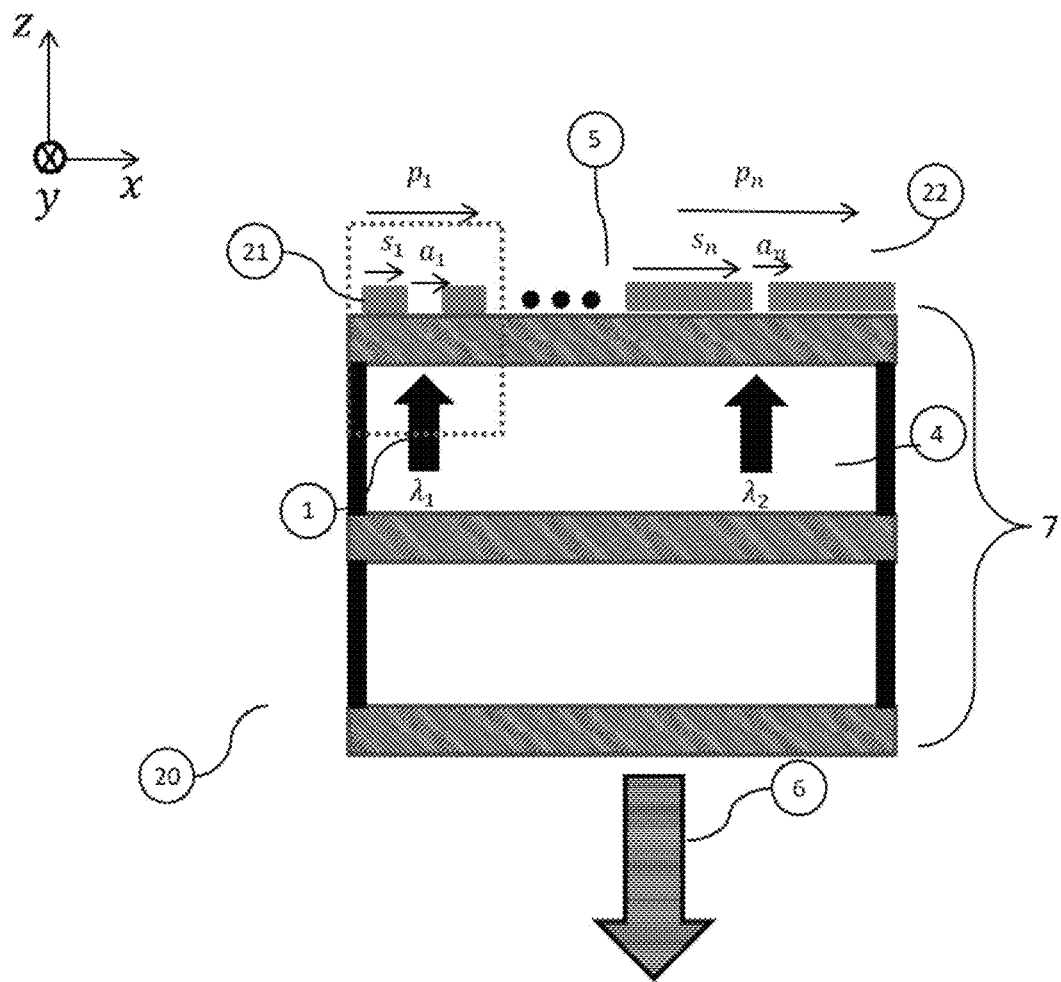
FIG. 3A, a Tamm electromagnetic THz cavity according to a second embodiment of the invention, the resonant frequency of which is tunable.

FIG. 3A illustrates a schematic profile view of a Tamm electromagnetic THz cavity 20 according to a second embodiment of the invention. In this embodiment, the DBR is identical to that of the cavity 10 but the upper metal layer 5 is discontinuous. It is structured so as to form a grating of metal strips of width s and separated by a distance a and of fill factor ff=s/p with p=s+a. It is known that the resonant frequency of the cavity 20 and the quality factor of the cavity 20 decrease as the fill factor decreases.

Figure 4A:
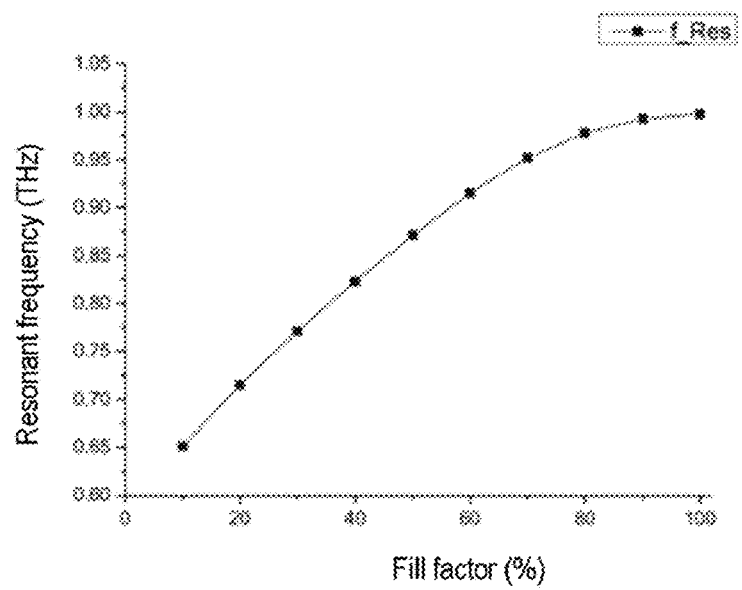
FIG. 4A and FIG. 4B, the variation, as a function of the fill factor, in the resonant frequency and quality factor of the Tamm electromagnetic THz cavity of the second embodiment.
Figure 4B:
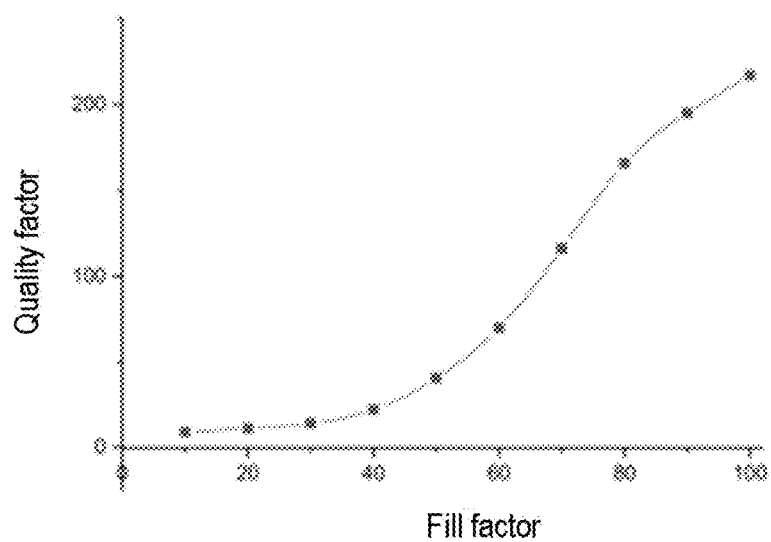

FIG. 4A and FIG. 4B show the variation in the resonant frequency and in the quality factor as a function of the fill factor of the Tamm cavity 20, respectively, in the case where the upper metal layer is structured so that the fill factor is constant in the x-direction. Here, the periodicity p of the Tamm cavity is set and equal to 75 µm, whereas the width s of the metal strips varies with ff. It may be seen that resonant frequency and quality factor increase with fill factor. It is therefore possible to tune the resonant frequency of the cavity 20 by varying the fill factor ff for various regions of the upper metal layer 5.

Thus, in the embodiment of FIG. 3A, the upper metal layer 5 is structured so as to comprise gratings of metal strips with a plurality n of different fill factors that vary in the x-direction, so as to allow a plurality of different THz frequencies of the incident radiation to be coupled to the cavity 20 and Tamm modes of different frequencies to be excited. Concretely, the structured upper metal layer possesses a plurality of different regions, each possessing a different fill factor giving, to the assembly formed by this region and the DBR below, a resonant frequency different from the others.

Thus, in the region 21 of the upper metal layer, the fill factor is $ff_1=s_1/p_1$ so as to couple radiation incident at the wavelength $\lambda_1$ by exciting a Tamm mode at this wavelength. In the region 22 of the upper metal layer, the fill factor is $ff_n=s_n/p_n$ so as to couple radiation incident at the wavelength $\lambda_n$ by exciting a Tamm mode at this wavelength.

In another embodiment, the structured upper metal layer possesses a single region and a single fill factor, which is used to very precisely adjust the resonant frequency of the cavity after manufacture of the stack (DBR).

In one non-limiting example, the upper metal layer 5 of the cavity 20 is structured so that the fill factor gradually varies from 10% to 100% in the x-direction in order to pass from a resonant frequency $f_1$=0.65 THz for the region 21 of the cavity 20 to a resonant frequency $f_2$=1 THz for the region 21 of the cavity 20, respectively (see FIG. 4A).

As shown in FIGS. 4A and 4B, this structure of the upper layer 5 of FIG. 3A permits a tunability of the resonant frequency of the cavity 20 of about 35%, to the detriment of the quality factor, which decreases with the resonant factor. Specifically, the quality factor is about Q=10 for a fill factor ff=10% and about Q=200 for a fill factor ff=90%.

Figure 3B:
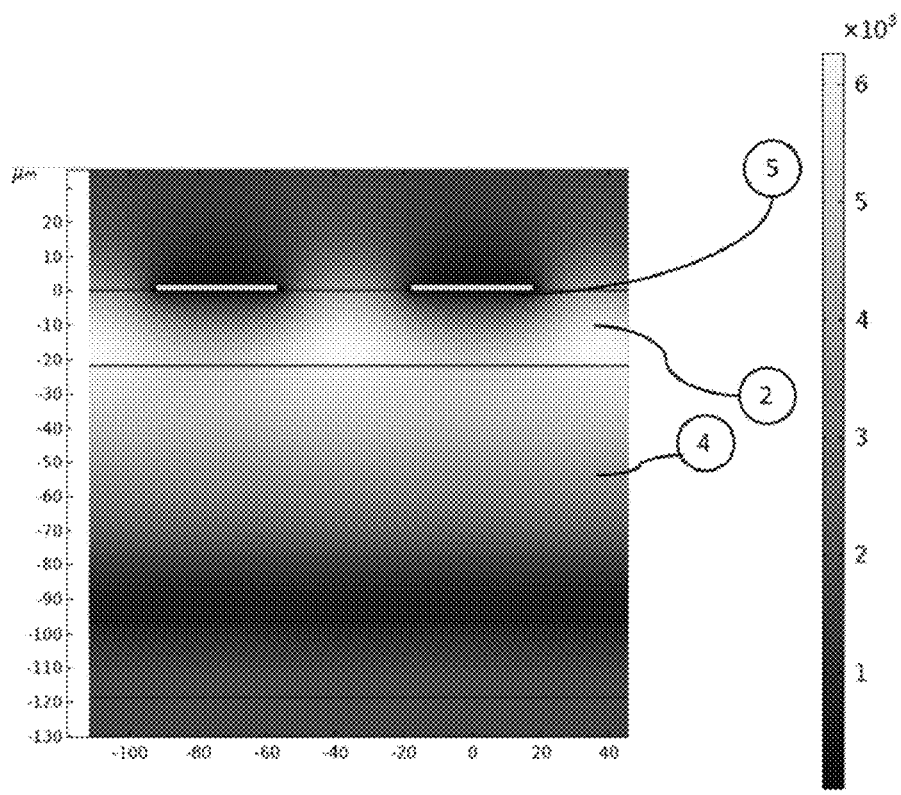
FIG. 3B, the profile of the electromagnetic field within the Tamm electromagnetic THz cavity according to the second embodiment of the invention.

FIG. 3B shows the profile of the electric field of the Tamm mode at $\lambda_1=c/f_1$ in the region 21 of the cavity 20, for a fill factor ff=0.5 and p=75 µm, giving a resonant frequency $f_1$=0.87 THz. By virtue of the confinement of the electric field between the metal strips on top of the upper dielectric layer of the stack, the electric field is localized to this region, giving access to a higher electric-field amplitude (approximately 3.5 V/m). Furthermore, it may be seen that below the upper dielectric layer of the DBR 7, the electric field is stronger (higher than 5 V/m), and even stronger still in regions directly below zones not covered by the upper metal layer.

This is an additional feature with respect to the embodiment of FIG. 1, in which the electric field is confined uniformly at the dielectric-air interface. This effect is related to the periodic sub-wavelength distribution of the metal, which results in an enhancement of the field between the strips.

Structuring the upper metal layer therefore makes it possible to enhance and confine the electric field of the Tamm mode.

It is the presence of air between the dielectric layers and between the metal strips that allows an active element to be easily placed in the regions of the cavity 20 where the electric field of the Tamm mode is strongest. It is thus possible to easily achieve coupling between THz light and matter with active elements of characteristic dimensions of 1 to 100 microns, and preferably 10 to 40 microns, and with a high energy density. By characteristic dimension, what is meant is the largest dimension of an element (for example the diagonal in the case where the element is a cube).

In this embodiment, the cavity may be used in transmission geometry because the upper metal layer has a non-zero transmittance.

Figure 5A:
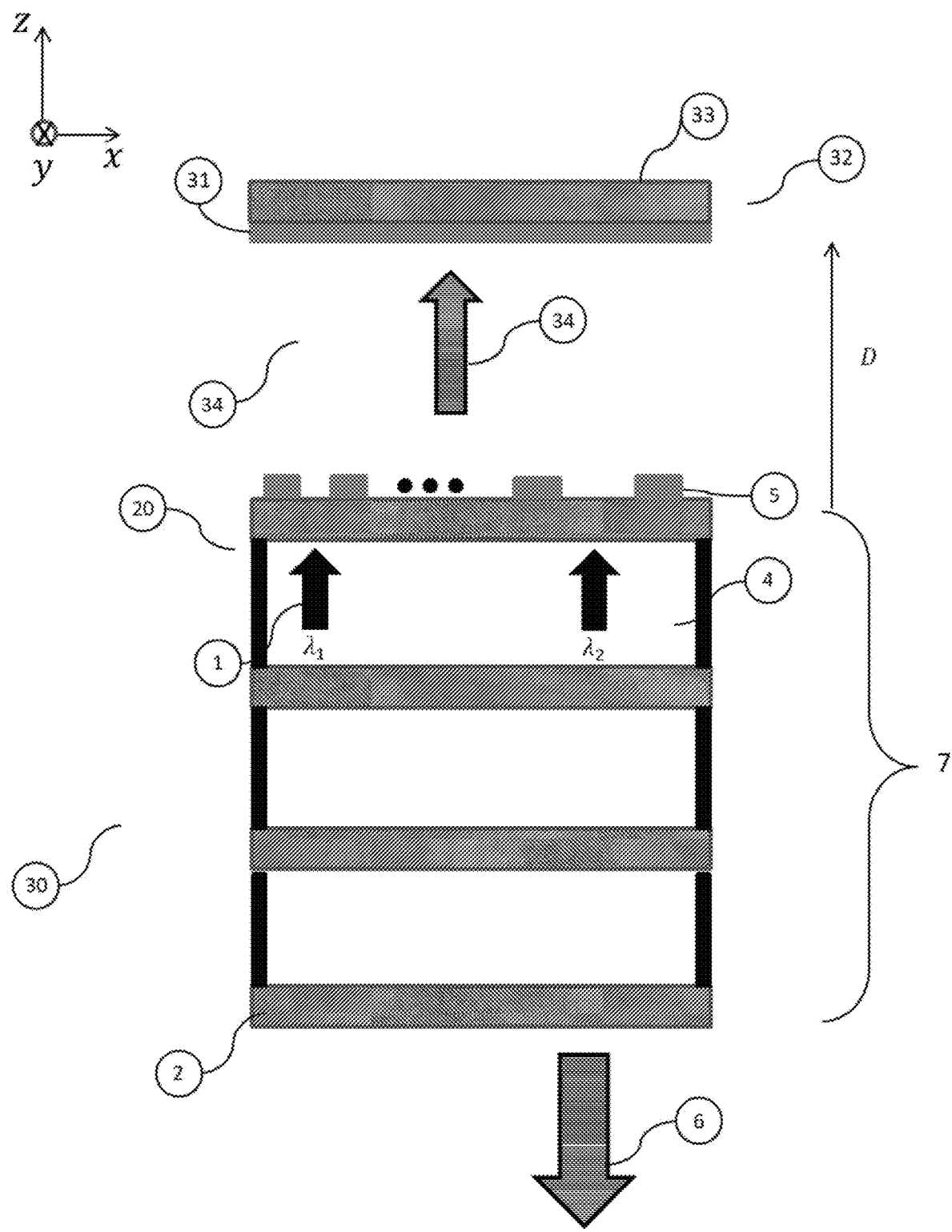
FIG. 5A and FIG. 5B, a Tamm electromagnetic THz cavity according to a third embodiment of the invention and the variation, as a function of the fill factor, in the quality factor of said cavity, respectively.
Figure 5B:
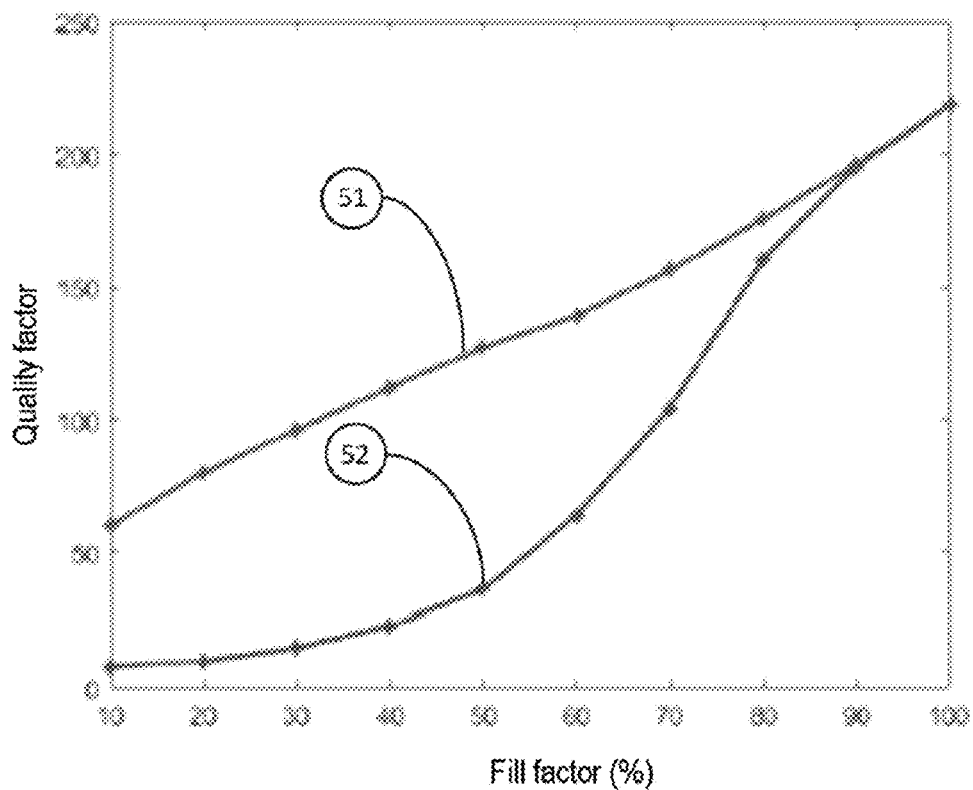

In order to obtain a THz cavity the resonant frequency of which is tunable, while maintaining a high quality factor, the cavity 30 of the third embodiment of the invention, which is schematically shown in profile in FIG. 5, comprises a mirror 31. This mirror 31 is composed of a lower metal layer 32 and a carrier layer 33. In the embodiment of FIG. 5, the assembly 20 formed by the DBR 7 and the upper metal layer 5 is identical to that of FIG. 3A and the lower metal layer 32 of the mirror 31 is made of gold and the upper carrier layer 33 of the mirror 31 is made of silicon. The mirror 31 is placed above the upper metal layer 5 at a distance $D=\lambda_m/4$ from the latter in order to maximize the strength of the electric field in the upper metal layer and in the region below the upper dielectric layer of the stack 7. The mirror is separated from the layer by a dielectric layer 34. In the example of FIG. 5, this layer is a layer of air. Here, $\lambda_m$ corresponds to the longest resonant length of the cavity 30, i.e. that corresponding to the region 21 ($\lambda_1=c/f_1$). In another embodiment, $\lambda_m$ corresponds to the average of the resonant wavelengths of the cavity 30. The mirror 30 allows the radiation 34 transmitted by the assembly 20 formed by the DBR 7 and the upper metal layer 5 to be reflected, and therefore a higher cavity+mirror reflectivity to be obtained. This transmitted radiation 34 is due to the structuring of the metal layer 5 and is not present, or is present to a much lesser extent, in the embodiment of FIG. 1 in which the upper metal layer 5 is not discontinuous. The mirror 31 may be separated from the upper metal layer by a spacer. Curve 51 of FIG. 5B shows the variation in the quality factor of the cavity 30 (with the mirror 31 above) as a function of the fill factor, in the case where the upper metal layer is structured so that the fill factor is constant in the x-direction. Comparison of its variation with the variation of the quality factor of the cavity 20 without the mirror 31 above (curve 52 in FIG. 5B) clearly illustrates the improvement in the quality factor of the cavity 30 due to the addition of the mirror, particularly for fill factors lower than 80%. For example, for a fill factor ff=40%, the addition of the mirror 31 makes it possible to pass from a quality factor Q=20 to Q=120. The cavity 30 of the embodiment of FIG. 5 has a polarization dependence. Specifically, it is able to operate only with incident radiation possessing a TE polarization (in the y-direction).

Figure 6:
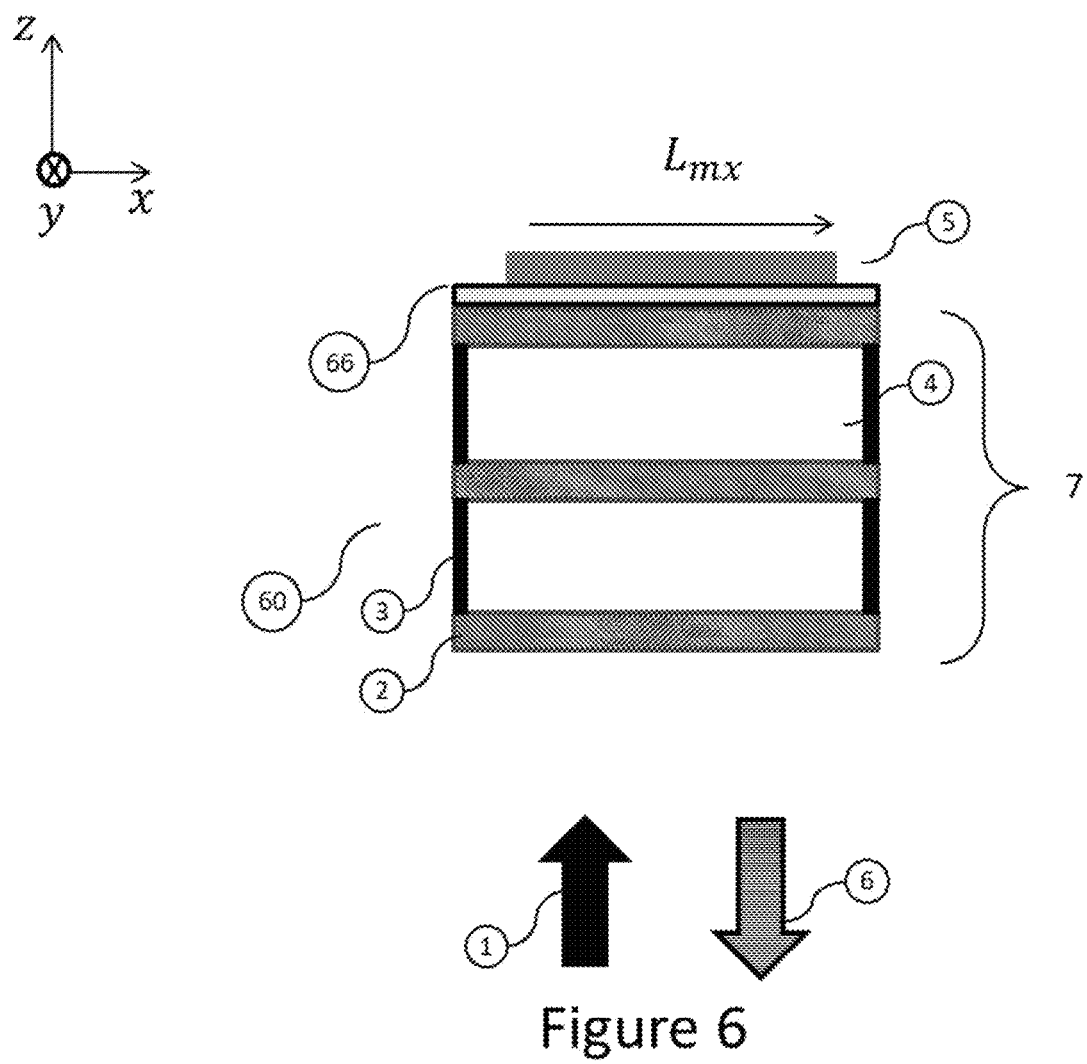
FIG. 6, a Tamm electromagnetic THz cavity according to a fourth embodiment of the invention.

In a fourth embodiment, an electromagnetic THz cavity 60 is similar to the electromagnetic cavity 10 of the embodiment of FIG. 1, with 2 major differences. First, the upper metal layer is structured to be an antenna possessing a resonant frequency equal to that of the electromagnetic cavity 10 formed by the DBR 7 and the upper metal layer 5. Second, it comprises an additional low-index phase layer 66 between the upper high-index layer and the metal layer. In one non-limiting example, this phase layer is made of a polymer of index intermediate between air and silicon 2. This embodiment is illustrated in FIG. 6.

In this fourth embodiment, the upper metal layer 5 is continuous and possesses a length $L_{mx}$ in the x-direction so as to be a metal dipole antenna possessing a resonant frequency equal to that of the cavity 10. This choice of dipole antenna makes for an enhancement of the quality factor and a local enhancement in the electric field of the Tamm mode when incident radiation of TM polarization (in the x-direction) propagates in the z-direction through the cavity.

This enhancement of the field gives access to a high energy density. It allows, from incident radiation at THz frequency of TM polarization (in the x-direction) and propagating in the z-direction through the cavity, light-matter coupling to be achieved by inserting active elements of characteristic dimension of about a few tens of microns into the region where the electric field of the Tamm mode is enhanced (for example at the corners of the antenna 5 in the third embodiment of the invention).

In another embodiment, the upper metal layer 5 is structured so as to be a bow-tie antenna, patch antenna or a split-ring resonator possessing a resonant frequency equal to that of the cavity 10 and allowing a local enhancement of the electric field of the Tamm modes to be obtained. Bow-tie and patch antenna structures and split-ring resonators, which are well known to those skilled in the art, make it possible to obtain a local enhancement of the electric field of the Tamm mode of up to several orders of magnitude (between the two facing triangles in the case of a bow-tie antenna and in the gap region in the case of a split-ring resonator).

This enhancement gives rise to an energy density that is extremely advantageous with regard to light-matter coupling achieved by inserting active elements of characteristic dimensions of a few tens of microns into the regions in which the electric field of the Tamm mode is enhanced.

In another embodiment, the upper metal layer 5 is structured so as to optimize its antenna structure to enhance its interaction with the DBR and to allow the transverse profile and the polarization of the Tamm mode excited by the incident radiation 1 to be controlled: in one non-limiting example, a bow-tie antenna allows the mode to be localized, and the electric field to be concentrated, in the spacing between the 2 portions of the antenna. In another non-limiting example, a 1D dipole antenna (a line that is thinner in one of its dimensions and that possesses a THz resonant frequency in only one of its dimensions) or a 2D dipole antenna (of square shape) may be chosen. It is thus possible to choose to have control as regards polarization or conversely to be insensitive thereto. Specifically, a 1D antenna possesses a resonance for a well-defined TM or TE polarization and allows the polarization of the excited Tamm mode to be set. Conversely, a 2D antenna resonates in the same way for both TM and TE polarizations, allowing a Tamm mode to be excited with both polarizations.

Figure 7:
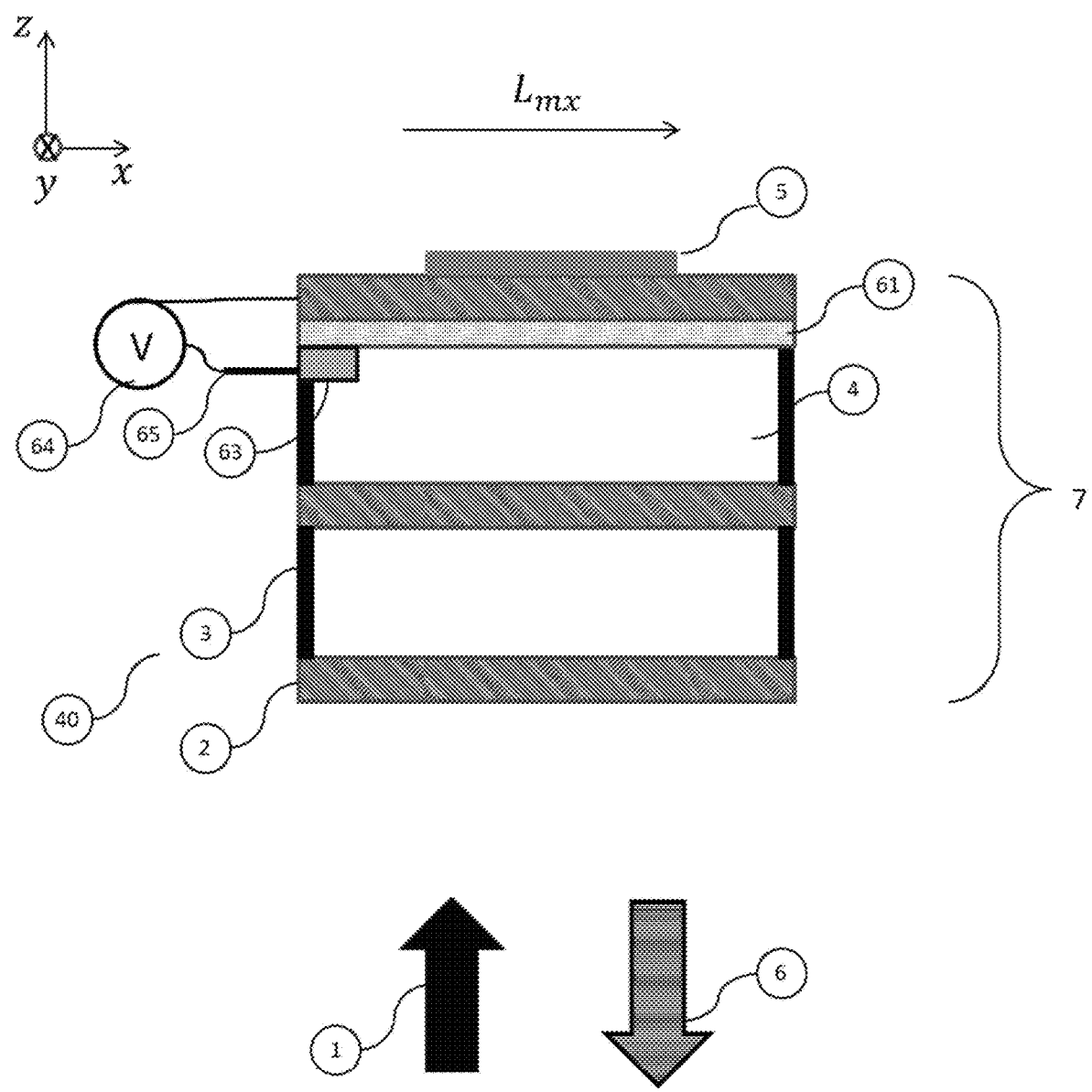
FIG. 7, a Tamm electromagnetic THz cavity according to a fifth embodiment of the invention.

FIG. 7 illustrates a fifth embodiment of the invention, in which a Tamm electromagnetic cavity 40 allows radiation 1 incident at a THz frequency to be coupled to an active region

61 made of graphene. In this embodiment, the stack 7 is identical to that of the embodiment of FIG. 3. The upper metal layer is identical to that of the fourth embodiment; it possesses a resonant frequency equal to that of the cavity 10. The cavity 40 in addition comprises a graphene layer 61 below the upper dielectric layer and making contact with the lower face of the latter. The graphene layer 61, which may be partially encapsulated, is here the active element or the active region of the cavity 40.

In the embodiment of FIG. 7, the graphene layer is continuous and entirely covers the lower face of the upper dielectric layer of the DBR. This graphene layer is deposited by chemical vapor deposition (CVD).

In another embodiment, the graphene layer is continuous and does not entirely cover the lower face of the upper dielectric layer of the DBR. It is a sheet, for example with a side length of a few tens of microns, produced by exfoliation and placed at the center of the Tamm mode, i.e. at the maximum of the Tamm electric field enhanced by the upper metal layer. In another embodiment, the upper metal layer 5 is structured so as to be an antenna possessing a resonant frequency equal to that of the cavity 10 and allowing a local enhancement of the electric field of the Tamm mode to be obtained. Also in this embodiment, the graphene sheet 61 is placed below the upper dielectric layer of the DBR at the maximum of the electric field of the Tamm mode in order to achieve the strongest possible light-matter coupling.

The graphene layer 61 may be a monolayer, in which case its thickness is that of one carbon atom (about 3.5 Å). Alternatively, the graphene layer 61 may be a stack in the z-direction of a plurality n of monolayers, in which case its thickness is equal to n×3.5 Å.

In addition, the cavity 40 comprises a metal layer 63, referred to as the electrode, below the graphene layer 61 but that does not completely cover the latter. The electrode 63 is a metal layer that makes contact with the graphene layer 61 via a metal electrical contact (not shown in FIG. 7). In the embodiment of FIG. 7, this metal contact is achieved via a gold metal deposit of a few microns in side length and of about 200 nm in thickness. In another embodiment, the contact may be made of any other metal or using a conductive layer such as a layer of doped graphene.

An electrical circuit 64 is connected to the electrode 63 by a metal line 65 exiting from the cavity 40. Preferably, the metal line 65 possesses a diameter much smaller than the resonant wavelength of the cavity so as to limit the extent to which the Tamm mode is disturbed by the introduction of this metal line.

Moreover, the electrical circuit is also connected to the metal layer 5 or to the upper dielectric layer of the DBR. The electrical circuit 64 is configured to apply a gate voltage or potential difference across the electrode 63 and the metal layer 5.

The application of a gate voltage via the electrode 63 connected to the electrical circuit 64 creates an electric field in the graphene layer and allows a Fermi level of this layer to be set or controlled. It will be recalled here that graphene possesses a band gap of 0 eV and a band structure exhibiting a linear dispersion (Dirac cone). Without this electric field the Fermi level is poorly controlled, and the electrical circuit therefore allows the electronic and optical behavior of graphene to be dictated. Thus if a gate voltage such that the Fermi level is 0 eV, which corresponds to the Dirac point in the dispersion relation, is chosen, the conductivity of graphene at THz frequencies will be governed by interband processes. Conversely, if a gate voltage such that the Fermi level is higher than a few meV is chosen, the absorption of graphene at THz frequencies will be governed by intraband processes.

Thus, depending on the gate voltage applied by the electrical circuit 64 and chosen by the user, the active graphene region 61 will behave as an optical gain medium, a photoconductor, a modulator or an absorber for the Tamm mode excited in the cavity by the incident THz radiation 1.

The invention claimed is:

1. A Tamm electromagnetic cavity possessing a resonant frequency in the THz domain, comprising:
    an interference mirror that is reflective in the THz domain, the interference mirror comprising a stack of dielectric layers comprising an alternation, in a z-direction, of two different layers, a layer of high refractive index and a layer of low refractive index, the refractive index of the layer of low refractive index being lower than that of the refractive index of the layer of high refractive index, and being manufactured by stacking layers mechanically or by joining dielectric layers to one another; and
    an upper metal layer deposited on or added to an upper dielectric layer of said interference mirror so as to form a structure that supports at least one Tamm mode in the THz domain, the upper metal layer being structured so as to form an antenna possessing a resonant frequency equal to that of the electromagnetic cavity.

2. The electromagnetic cavity as claimed in claim 1, wherein the upper metal layer is continuous.

3. The electromagnetic cavity as claimed in claim 1, wherein the upper metal layer is structured so as to control the transverse mode and the polarization of the one or more Tamm modes.

4. The electromagnetic cavity as claimed in claim 1, wherein the structured upper metal layer forms a bow-tie antenna, a patch antenna, a dipole antenna, or a split-ring resonator.

5. The electromagnetic cavity as claimed in claim 1, wherein at least one of the layers of low refractive index of the interference mirror is formed by a spacer separating two layers of high refractive index so as to obtain a layer of air between two layers of high refractive index.

6. The electromagnetic cavity as claimed in claim 1, wherein the dielectric layers are made of high-resistivity silicon, of semi-insulating GaAs or of quartz, or are made of a polymer film.

7. The electromagnetic cavity as claimed in claim 1, comprising a layer referred to as the mirror layer, above the upper metal layer and separated by a dielectric layer, said mirror layer comprising a lower metal layer and an upper carrier layer, wherein the upper metal layer is a layer of superconductor.

8. The electromagnetic cavity as claimed in claim 1, comprising an active element of a characteristic size comprised between 1 and 100 microns, placed in the cavity so as to be able to be coupled to the Tamm mode excited in said cavity.

9. The electromagnetic cavity as claimed in claim 8, wherein the active element is placed within a layer of air of the interference mirror, said layer being located below the upper dielectric layer.

10. The electromagnetic cavity as claimed in claim 8, wherein the active element is made of graphene.

11. The electromagnetic cavity as claimed in claim 10, comprising a metal layer referred to as the electrode making electrical contact with the graphene active element and connected to an electrical circuit configured to apply a gate voltage to said graphene active element.

12. A method for using an electromagnetic cavity as claimed in claim 1, comprising:
   illuminating said cavity with incident radiation propagating in said z-direction at a THz frequency equal to the resonant frequency of said cavity; and
   exciting a Tamm mode at a resonant frequency of the cavity.

13. A Tamm electromagnetic cavity possessing a resonant frequency in the THz domain, comprising:
   an interference mirror that is reflective in the THz domain, the interference mirror comprising a stack of dielectric layers comprising an alternation, in a z-direction, of two different layers, a layer of high refractive index and a layer of low refractive index, the refractive index of the layer of low refractive index being lower than that of the refractive index of the layer of high refractive index, and being manufactured by stacking layers mechanically or by joining dielectric layers to one another; and
   an upper metal layer deposited on or added to an upper dielectric layer of said interference mirror so as to form a structure that supports at least one Tamm mode in the THz domain, the upper metal layer being structured so as to form a grating of metal strips of width s and of period p, separated by a distance a, and of fill factor ff=s/p with p=s+a.

14. The electromagnetic cavity as claimed in claim 13, wherein the fill factor ff of the grating of metal strips varies in the x-direction so as to allow a plurality of different THz frequencies of incident radiation to be coupled to said electromagnetic cavity.

15. The electromagnetic cavity as claimed in claim 13, wherein at least one of the layers of low refractive index of the interference mirror is formed by a spacer separating two layers of high refractive index so as to obtain a layer of air between two layers of high refractive index, the electromagnetic cavity comprising an active element of a characteristic size comprised between 1 and 100 microns, placed in the cavity so as to be able to be coupled to the Tamm mode excited in said cavity.

16. The electromagnetic cavity as claimed in claim 13, wherein the dielectric layers are made of high-resistivity silicon, of semi-insulating GaAs or quartz, or are made of a polymer film.

17. The electromagnetic cavity as claimed in claim 13, comprising a mirror layer, above the upper metal layer and separated by a dielectric layer, said mirror layer comprising a lower metal layer and an upper carrier layer, wherein the upper metal layer is a layer of superconductor.

18. A method for using an electromagnetic cavity as claimed in claim 13, comprising:
   illuminating said cavity with incident radiation propagating in said z-direction at a THz frequency equal to the resonant frequency of said cavity; and
   exciting a Tamm mode at a resonant frequency of the cavity.

* * * * *